US011019428B2

(12) United States Patent
Matthias et al.

(10) Patent No.: US 11,019,428 B2
(45) Date of Patent: May 25, 2021

(54) METHOD FOR RECEIVING AUDIO DATA STREAMS WITH MOBILE DEVICES AND CORRESPONDINGLY CONFIGURED MOBILE DEVICE

(71) Applicant: Sennheiser electronic GmbH & Co. KG, Wedemark (DE)

(72) Inventors: Steffen Matthias, Hamburg (DE); Konstantin Septinus, Hamburg (DE); Rafael Cauduro Dias de Paiva, Hamburg (DE); SenthilKumar Vellaichamy, Wedel (DE)

(73) Assignee: Sennheiser electronic GmbH & Co. KG, Wedeinark (DE)

( * ) Notice: Subject to any disclaimer, the term of this patent is extended or adjusted under 35 U.S.C. 154(b) by 0 days.

(21) Appl. No.: 16/679,428

(22) Filed: Nov. 11, 2019

(65) Prior Publication Data
US 2020/0154203 A1 May 14, 2020

(30) Foreign Application Priority Data
Nov. 12, 2018 (DE) .......................... 102018128162.5

(51) Int. Cl.
*H04R 3/12* (2006.01)
*H04L 29/06* (2006.01)
*H04L 12/28* (2006.01)

(52) U.S. Cl.
CPC ........... *H04R 3/12* (2013.01); *H04L 12/2827* (2013.01); *H04L 12/2838* (2013.01); *H04L 65/60* (2013.01); *H04L 2012/2841* (2013.01); *H04L 2012/2849* (2013.01); *H04R 2420/07* (2013.01)

(58) Field of Classification Search
CPC . H04L 12/2827; H04L 12/2838; H04L 65/60; H04L 2012/2841; H04L 2012/2849; H04R 3/12; H04R 2420/07; H04R 2227/005
USPC .............................. 381/77, 82, 124, 306, 311
See application file for complete search history.

(56) References Cited

U.S. PATENT DOCUMENTS

| 9,232,307 B2 | 1/2016 | Sherman et al. | |
| 2005/0192025 A1* | 9/2005 | Kaplan | H04W 4/029 455/456.1 |
| 2012/0308035 A1* | 12/2012 | Ginn | H04N 21/42202 381/80 |

(Continued)

*Primary Examiner* — William A Jerez Lora
(74) *Attorney, Agent, or Firm* — Haug Partners LLP

(57) ABSTRACT

A method for receiving audio data streams with mobile devices in different rooms in which sound is emitted via loudspeakers. Each mobile device connects over a local wireless network to a server that controls the sound emitted in the rooms via loudspeakers. Each mobile device detects room information, emitted only in the corresponding room, that indicates the room the respective mobile device is in. The room information is transmitted from each mobile device to the server. The server associates each room information with an output audio data stream that corresponds to the sound emitted via loudspeaker in the respective room in which the mobile device has detected the room information. The server assigns to each of the mobile devices an output audio data stream corresponding to the respective room information, and transmits the output audio data stream over the local network to the mobile device, which receives and replays it.

15 Claims, 3 Drawing Sheets

(56) References Cited

U.S. PATENT DOCUMENTS

| | | | |
|---|---|---|---|
| 2015/0051723 A1* | 2/2015 | Bates | H04N 21/8113 |
| | | | 700/94 |
| 2017/0024184 A1* | 1/2017 | Yuki | H03G 3/3005 |
| 2017/0242653 A1* | 8/2017 | Lang | H04R 3/00 |
| 2018/0253276 A1* | 9/2018 | Kodama | H04R 3/12 |

* cited by examiner

METHOD FOR RECEIVING AUDIO DATA STREAMS WITH MOBILE DEVICES AND CORRESPONDINGLY CONFIGURED MOBILE DEVICE

The present application claims priority from German Patent Application No. 10 2018 128 162.5 filed on Nov. 12, 2018, the disclosure of which is incorporated herein by reference in its entirety.

FIELD OF THE INVENTION

The invention relates to a method for receiving audio data streams with mobile devices, a data carrier having stored thereon program code that is suitable for correspondingly configuring a mobile device, and a correspondingly configured mobile device.

BACKGROUND

Audio reproduction systems for sound detection by means of a microphone and for providing output audio signals via loudspeakers have been known for long and are used in lectures, presentations, conferences etc.

U.S. Pat. No. 9,232,307 B2 discloses a wireless transmission system in which users may use their mobile device, e.g. a smartphone or PDA (Personalized Digital Assistant), at a convention or conference as a personal microphone for speaking via an existing amplifier system. They may also use the mobile device for listening via headphones to the signal reproduced via the amplifier system. For this purpose, the mobile device is connected to the amplifier system via a mobile network or a wireless local network. However, the user must first call a phone number to use the service, whether in the conference room or anywhere else. A moderator or a corresponding automated function assigns a caller a place on a speaker waiting list. However, one central microphone intended for the speaker is wired and is connected to the amplifier system independently from the mobile devices. It is therefore firmly tied to the room. Different rooms use separate transmission systems and each room needs a separate central microphone.

SUMMARY OF THE INVENTION

An object of the present invention is to provide an improved method for receiving audio data streams with mobile devices in rooms in which sound is emitted via loudspeakers, wherein each mobile device shall recognize and reproduce, among a plurality of audio data streams, an audio data stream associated with the respective room.

A method in accordance with the invention is disclosed. In the method, each mobile device connects via a wireless local network to a server that controls the sound that is emitted in the rooms. Each mobile device detects room information that indicates, among the plurality of rooms, the room in which the mobile device is located, and that is acoustically emitted only in the associated room. The room information is transmitted from each mobile device to the server via the local network. In the server, each room information is associated with an output audio data stream that corresponds to the sound emitted via the loudspeaker in the room in which the respective mobile device detected the room information. The server selects among a plurality of output audio data streams of different rooms and assigns to each of the mobile devices an output audio data stream, corresponding to the room information received by the respective mobile device. Finally, the respectively assigned output audio data stream is transmitted via the local network to each mobile device, where it is received and reproduced.

The invention further relates to a data carrier having stored thereon program code adapted for configuring a mobile device for executing the steps of the above-mentioned method that are to be executed by the mobile device.

The invention further relates to a mobile device with a correspondingly configured processor.

Further advantageous embodiments are described in the dependent claims.

The invention allows an audio reproduction system to be used more flexibly, in particular in connection with individual mobile devices.

BRIEF DESCRIPTION OF THE DRAWINGS

Further details and advantageous embodiments are depicted in the drawings, showing in FIG. 1 an overview over a local network connected to a plurality of rooms.

DETAILED DESCRIPTION OF THE INVENTION

Figure 1:
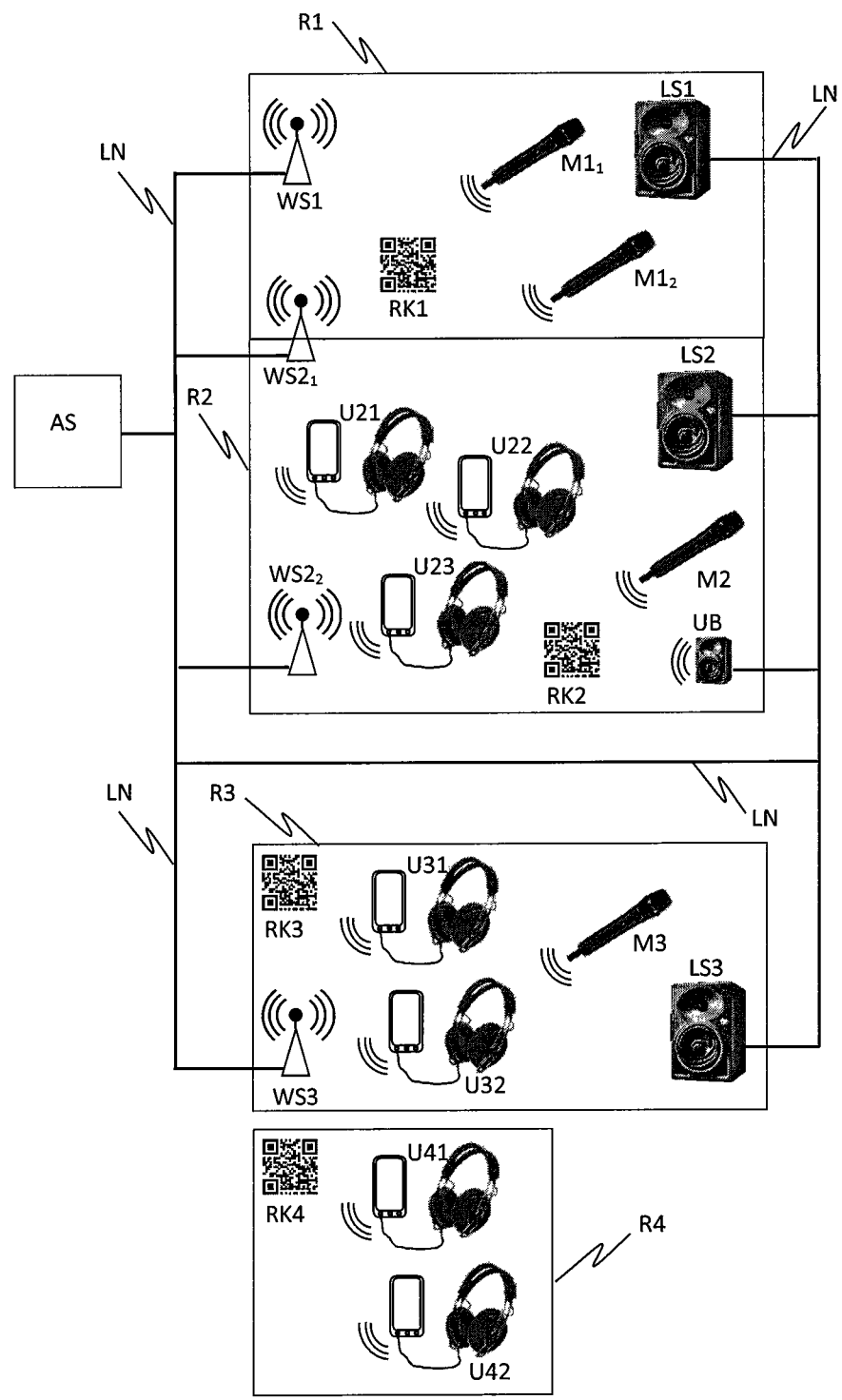

FIG. 1 shows an overview over a local network LN, e.g. Wi-Fi (IEEE-802.11) or LTE, that is connected to a plurality of rooms R1, R2, R3, R4. The local network LN may also be a (logically complete) portion of a mobile radio network, such as LTE or "5G", or at least use the same technology as a mobile radio network. The rooms may but need not necessarily be located in the same building. Each room is located in the reception area of at least one wireless base station WS1, $WS2_1$, $WS2_2$, WS3 of the local network LN. One or more of the wireless base stations may also be located in the rooms, wherein their signal can then usually be received also outside the respective room. At least one audio streaming server AS is connected to the local network LN. The audio streaming server AS, which is hereafter referred to as server only, implements the center of an audio reproduction system for sound detection that is usable in the rooms R1, . . . , R4, and provides different output audio signals for the rooms. For sound detection, one or more wireless microphones $M1_1$, $M1_2$, M2, M3 may be in the rooms. The wireless microphones are connected to the server AS via the local network LN, e.g. via one of the wireless base stations WS1-WS3. Likewise, an audio reproduction is possible in each of the rooms R1, . . . , R4. The audio reproduction may be done by fixed or mobile loudspeakers LS1, LS2, LS3, or by mobile devices U21-U42, such as e.g. correspondingly configured smartphones of users. In each of the rooms R1, . . . , R4, at least one specific audio signal that is assigned to the respective room by the server AS may be reproduced, e.g. one that was recorded by one or more wireless microphones $M1_1$-M3 in the same room.

However, none of the wireless microphones $M1_1$-M3 in this example is permanently assigned to one of the rooms R1, . . . , R4. Instead, each of the wireless microphones $M1_1$-M3 may be used in each of the rooms. However, only temporarily it is automatically assigned to the room in which it is physically located. This is done by the wireless microphone detecting room information RK1,RK2,RK3,RK4 that is detectable only in the respective room. The room information RK1, ..., RK4 may be e.g. an acoustic, an optic or an electromagnetic signal. Suitable for this purpose is e.g. an ultrasonic signal that is emitted in the room and that comprises a room indication or room identifier respectively. In another variant, a QR code, bar code or something similar comprising a room identifier is provided in the room in order to be detected by the wireless microphone. In a further variant, an electromagnetic near field (NFC) is used that is available only in the room and that comprises a room identifier. When the wireless microphone leaves the room, the temporary assignment may be resolved.

A wireless microphone $M1_1$-M3 that is brought into the room is connected to the local network LN, but initially not assigned to any room. In the room, the wireless microphone preferably automatically detects the room information RK1, ..., RK4 and transmits it via the local network LN to the server AS. The assignment of the room information to a room R1, ..., R4 is known to the server AS, so that by means of this assignment it may automatically detect in which of the rooms the wireless microphone $M1_1$-M3 is currently located. To this room it assigns it temporarily.

For example, a first wireless microphone $M1_1$ may be brought into a first room R1, as shown in FIG. 1, while a second wireless microphone M2 is brought into a second room R2. After each of the two wireless microphones M1,M2 detected the respective room identifier RK1,RK2 and transmitted it via the local network LN to the server AS, the latter temporarily assigns each of the wireless microphones to its respective room R1,R2.

Each of the wireless microphones generates an input audio signal and transmits it via the local network LN to the server AS. The server generates, corresponding to the room identifier RK1, ..., RK4, from the input audio signals at least two output audio signals that differ from each other and that are also assigned to one of the rooms R1, ..., R4 each. The server AS provides these output audio signals via the local network LN, which can be received in all rooms, at least to the respective room to which it is assigned. However, the room in which the respective wireless microphone is located and to which the respective input audio signals are therefore assigned, needs not coincide with the room to which the output audio signal is assigned. As already mentioned above, the local network is usually not necessarily limited to a room, so that the output audio signals may also be physically received in other rooms near the respective room. In one embodiment, the output audio signals may be received in the entire area of the local network LN. In one embodiment, the server AS may additionally ensure that each output audio signal can only be reproduced in the room or rooms to which it has been assigned.

For example, the server may assign an output audio signal generated from an input audio signal $M1_1$ of a first wireless microphone that is located in the first room R1 to this first room R1. At the same time, the server may assign a second output audio signal generated from an input audio signal of a second wireless microphone M2 located in the second room R2 to this second room R2. Since usually different events take place in the different rooms R1,R2 in which the wireless microphones $M1_1$,M2 are used, the input audio signals as well as the output audio signals differ from each other, depending on the room. However, the assignment of the wireless microphones $M1_1$,M2 to the rooms R1,R2 is flexible and only temporarily valid.

Due to this flexibility it is possible, for example, that a further wireless microphone $M1_2$ which is connected to the local network and which is also brought into the first room R1 and has detected the room identifier RK1 of this room is also assigned to this room. The signals of both wireless microphones $M1_1$,$M1_2$ assigned to this room R1 may be mixed in the server AS, and the mixed audio signal may be assigned as output audio signal to the room R1. Likewise it is possible, for example, that an audio signal coming from a wireless microphone M3 located in a third room R3 is assigned to this third room R3 and to further rooms, e.g. a fourth room R4. The fourth room R4 is located within the reception area of the local network LN, e.g. due to a nearby wireless base station WS3, as shown in FIG. 1. However, it needs not necessarily be directly adjacent to the third room R3. If the fourth room R4 has an own room identifier RK4 that differs from the room indication RK3 of the third room, the assignment of input and output audio signals to the two rooms may be done independent from each other. In principle, the room identifier of the fourth room R4 may also be the same as that of the third room R3, so that the server does not differ between the two rooms.

The server may not assign an input audio signal neither an output audio signal to a room that has no room identifier. Therefore, in one embodiment, a mobile device there may connect to the local network LN but not reproduce an output audio signal. In another embodiment however, the server may unlock an output audio signal, thus allowing it to be played back in the entire reception area of the local network LN, or in a defined part thereof. But this is an additional mode that is required only in exceptional cases, e.g. at a central event where the audience may be in several rooms that are distributed all over a building. If a wireless microphone is located in a room that is within the reception area of the local network LN but has no room identifier, it will either not output an audio signal, or the server will ignore its input audio signal or at least will not be able to assign it to an output audio signal.

The transmission of the output audio signal via the local network LN may be done in different ways. In one embodiment, the server AS provides via a 1:1 connection (unicast), individually for each authenticated sound reproducing device a downlink stream comprising the output audio signal assigned to the respective room. In another embodiment, the server generates a list of sound reproducing devices that are authenticated for a particular room or a particular output audio signal, and provides the respective output audio signals via a 1:N connection (multicast) to the sound reproducing devices contained in the list. In a further embodiment, the server AS transmits to each authenticated sound reproducing device only key information that is required for audio reproduction by the sound reproducing device, while the output audio signals may be received freely.

Advantageously, in principle each wireless network with a low latency can be used as local network LN, such as for example WLAN/WiFi, LTE or similar. For the complete system comprising wireless transmission from the microphone, processing at the server and transmission to the sound reproducing devices, a low latency below a maximum value of few milliseconds, e.g. 20 ms, should be maintained.

In one embodiment, there will initially only control data including the room information RK1, ..., RK4 be transmitted via the connection from the wireless microphone $M1_1$-M3 over the local network LN to the server AS. Audio output from the wireless microphone is initially disabled and will only be enabled after the server verified the control data and unlocked the wireless microphone.

In one embodiment, detecting the room information RK1, ..., RK4 is done acoustically in at least one of the wireless microphones. In this case, the room information may be emitted e.g. as ultrasound from the loudspeaker (LS1,LS2,LS3). Alternatively, the room information may be emitted as ultrasound from another suitable additional loudspeaker (e.g. ultrasonic beacon UB), e.g. if the loudspeaker LS2 is not suitable for ultrasound. In a variant, the server may adaptively adjust the volume for the reproduction of the room information to the volume of the (low-frequency, e.g. below 15 kHz) sound recorded by the wireless microphone, so as to make use of the psychoacoustic masking effect. The louder the recorded (low-frequency) sound, the louder will the room information (higher frequency, e.g. above 18 kHz) be played back acoustically. Alternatively, the room information is acoustically played back only if the recorded (low-frequency) sound has a minimum volume. This prevents persons in the room that may sense the room information from being disturbed. Otherwise, acoustic transmission e.g. in the very high audible or near-ultrasonic frequency range of 18-20 kHz might disturb in particular persons who may sense this signal, e.g. children.

In another embodiment, detecting the room information RK1, ..., RK4 is done in at least one of the wireless microphones optically, e.g. using an optical display that is electronically controlled by the server. In a further embodiment, detecting the room information RK1, ..., RK4 in at least one of the wireless microphones is done by an electromagnetic near field (NFC).

In one embodiment, the server may, after a certain time or periodically, require a re-authentication of the wireless microphone and/or the sound reproducing device in order to ensure that it is still within the respective room. In this case, it is advantageous if the wireless microphone or sound reproducing device respectively can detect the room information at any time. This is possible e.g. with ultrasonic transmission or with optically transmitted room information that uses an electronically controlled optical display (e.g. infrared beacon, display for QR code etc.). In one embodiment, the server AS may control the room information RK1,RK2,RK3 centrally, and modify it in certain time intervals. However, in this case it may happen that all sound reproducing devices in the room detect the modification simultaneously and signal it back to the server, which may lead to undesired traffic peaks in the local network LN or at the server AS respectively, e.g. in a larger lecture hall. Therefore, in a variant, the server may modify the room information of different rooms in a time-shifted manner.

A sound reproducing device, such as e.g. a loudspeaker or a mobile receiver (e.g. smartphone) with headphones or earphones that is in one of the rooms may receive and replay at least the output audio signal assigned to the respective room in which it is. However, it is also possible that it may receive over the local network several or all other output audio signals provided by the server. In one embodiment, the sound reproducing device may automatically select the output audio signal that is assigned to the respective room in which it is currently located. For this purpose, also the sound reproducing device may detect the room information RK1, ..., RK4 in its environment. But, in one embodiment, it may reproduce only the output audio signal that is assigned to the room in which it is currently located. In this case, the sound reproducing device may authenticate itself to the server, i.e. prove to the server that it is in the room, by means of the room information. In response, the server will unlock for it the output audio signal assigned to the respective room.

In principle, the sound reproducing device may also detect another, alternatively usable unique room information that is in the room, instead of using the same room information as the wireless microphone. The different types of room information need not necessarily be identical, as long as the server uniquely assigns both to the same room. For example, in FIG. 1 a wireless microphone M2 and a first mobile receiver U21 that are in a room R2 may detect the room information RK2 by an electromagnetic near field, while a second mobile receiver U22 that is also in the same room R2 detects the room information acoustically by an ultrasonic signal. The server assigns the room information transmitted by the electromagnetic near field and the room information transmitted by the ultrasonic signal uniquely to the same room R2. If the server assigns the input audio signal generated by the wireless microphone M2 as output audio signal to the room R2, it may be received over the local network LN through one of the wireless base stations $WS2_1,WS2_2$ and replayed by both (or all) mobile receivers U21,U22 in the room R2.

Further, a loudspeaker LS2 in the same room R2 may be mobile or fixedly installed and also receive the output audio signal over the local network LN. The loudspeaker may replay the output audio signal that is assigned to the room in which the loudspeaker currently is. Likewise, the ultrasonic beacon UB may be mobile or fixedly installed and also receive the room information over the local network LN. In one embodiment, also the loudspeaker LS2 detects the respective room information RK2 and uses it to authenticate itself to the server AS. In another embodiment however, if the loudspeaker is fixedly installed, it may be addressable by the server via a fixed (network) address and is thereby authenticated indirectly.

Figure 2:
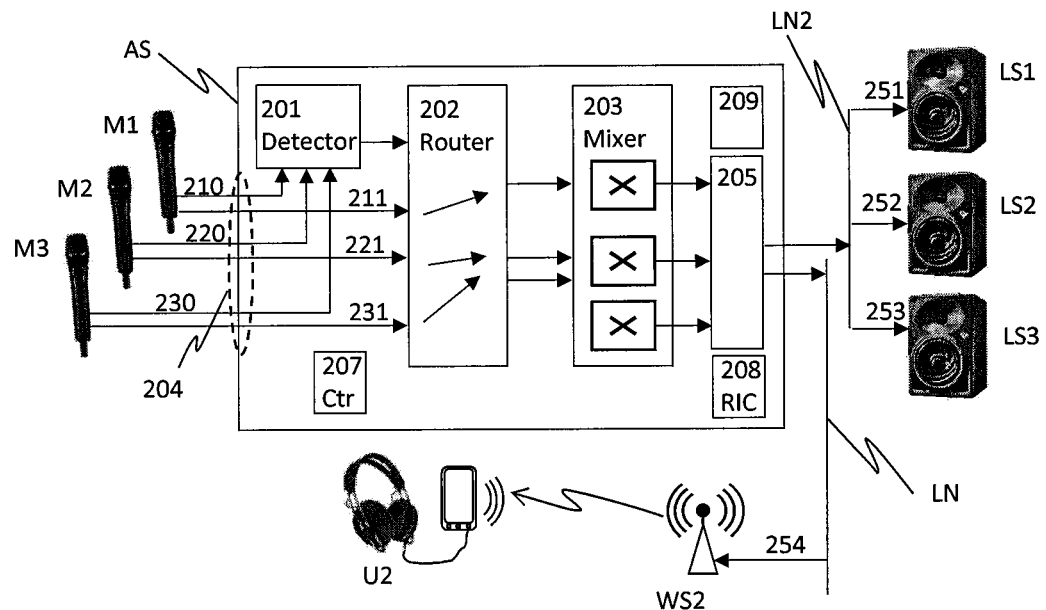
FIG. 2 a block diagram of a server.

FIG. 2 shows a block diagram of a server AS, according to the invention, for an audio reproduction system for sound acquisition and for providing various output audio signals. The server may receive via a local network LN several different input audio signals 211,221,231 from different wireless microphones M1,M2,M3 and provide different output audio signals 251,252,253,254 in several rooms. For this purpose, the server AS comprises an (input) interface 204, through which it may be connected to a local network LN and through which it may connect to at least two wireless microphones M1,M2,M3. This may be done e.g. via an uplink streaming service provided by the server. Initially, the server receives from each of the wireless microphones a signal 210,220,230 with control data and in particular with room information RK1,RK2,RK3 indicating, from the plurality of rooms reached by the local network, the room in which the respective wireless microphone is. This signal 210,220,230 is fed to a detector 201 that may verify the control data and that assigns each of the wireless microphones to a room by means of the room information. In one embodiment, the audio output of each microphone, or its processing in the server respectively, is initially switched off, and will be switched on only after the detector 201 has verified the control data and enabled/unlocked the respective wireless microphone, or the processing of its audio output signals respectively. The audio output signals of the wireless microphones are substantially the input audio signals 211, 221,231 of the server AS.

The assignment information from the detector 201 is fed to a router 202, which can be programmable in order to flexibly assign the input audio signals 211,221,231 to the output audio signals 251, ..., 254. In particular, it is also possible to assign a plurality of input audio signals to a single output audio signal, as indicated in FIG. 2. In the depicted example, input audio signals 221,231 from two wireless microphones M2,M3 are assigned to the same output audio signal. Herein, at least two output audio signals 251, . . . , 254 are composed from the input audio signals 211,221,231, according to the room information RK1,RK2, RK3 associated with the input audio signals. Finally, all input audio signals that are associated with one and the same output audio signal 251, . . . , 254 are mixed in a mixer 203.

The router 202 and the mixer 203, and optionally also the detector 201, may form an associating unit that comprises at least one processor. It is configurable by means of software so as to compose the at least two output audio signals from the input audio signals.

Moreover, the server AS comprises an output unit 205 for providing the at least two output audio signals 251, . . . , 254 over the local network LN and/or a further local network LN2. As described above, this is done in such a way that the output audio signals 251, . . . , 254 are receivable in the plurality of rooms R1,R2,R3. Furthermore, in each room at least the output audio signal that is associated with it may be automatically selectable by means of the room information.

For the reproduction, the server AS may establish a connection to at least one sound reproducing device U2,LS1-LS3 over the local network LN or the further local network LN2, in order to transmit to the sound reproducing device the output audio signal 251, . . . , 254 that is associated with the respective room in which the sound reproducing device is located. As explained above, the sound reproducing device may be e.g. a loudspeaker LS1-LS3 or a wireless mobile device U2 that is connected via a base station WS2 and that has an audio playback function. In one embodiment, the server AS additionally comprises a control unit 207, wherein the server first receives from each of the wireless microphones $M1_1$-M3 only control data including the room information RK1, . . . , RK4 and the control unit verifies the control data. Only then the control unit enables the reception of the input audio signal 211, 221,231 from the wireless microphone via the local network.

Further, the server AS may comprise a room information control unit 208, which may, over the local network LN, control and modify the room information emitted in one or more of the rooms R1, . . . , R4. The room information control unit 208 may be connected to the control unit 207.

In one embodiment, the server comprises a receiver assignment unit 209 by which it may receive, from a mobile sound reproducing device, room information of the room in which the mobile sound reproducing device is located, in order to then send to it, individually via a wireless connection, the output audio signal 254 that is associated with this room. Communication for this assignment may be done over the local network LN and a wireless base station WS2.

It is to be noted that FIG. 2 shows an input interface 204 and an output interface 205, which however may be one physical unit. In other words, the input interface 204 and the output interface 205 may be implemented as a single bidirectional network interface towards the local network LN. Further, it is to be noted in FIG. 2 that the output unit 205 is a logical unit comprising two parts, one of which is connected to the local network LN and the other to the further local network LN2.

Figure 3:
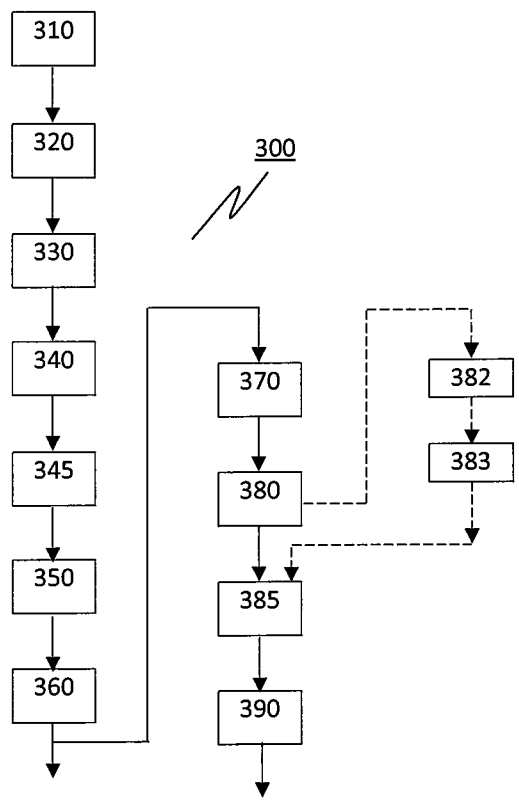
FIG. 3 a flow-chart of a method for configuring an audio reproduction system.

FIG. 3 shows a flow-chart of a method for configuring an audio reproduction system for sound detection and for providing different output audio signals to a plurality of rooms R1, . . . , R3. The method 300 comprises the steps of connecting 310 at least two wireless microphones M1,M2, M3 to a server AS over a local network LN, each wireless microphone detecting 320 a room information RK1,RK2, RK3, wherein the room information indicates, from a plurality of rooms, the room in which the respective microphone is currently located, then transmitting 330 the respective room information over the local network from each wireless microphone to the server, generating 340 an input audio signal in each wireless microphone and transmitting 345 the respective input audio signal over the local network to the server. Further, the input audio signals are compiled 350 or combined respectively in the server to obtain at least two output audio signals 251, . . . , 254, wherein the compiling is done in accordance with the room information. The at least two output audio signals are each assigned to one of the rooms and differ from each other. Finally, the at least two output audio signals 251, . . . , 254 are provided 360 over the local network LN such that each of the output audio signals can be received in the plurality of rooms.

In one embodiment, the method further comprises transmitting 370 the output audio signals 251, . . . , 254 over the local network LN and/or the further local network LN2 into the plurality of rooms. In one embodiment, at least one sound reproducing device LS1-LS3,U21-U42 that is in one of the plurality of rooms may receive 380 and replay 390 the output audio signal associated with the room in which the respective sound reproducing device is.

In one embodiment, the output audio signals 251, . . . , 254 are transmitted into at least one of the plurality of rooms R1,R2,R3 over the local network LN as well as over the further local network LN2, wherein the further local network LN2 is a DANTE network. At least one of the sound reproducing devices connected to it is fixedly installed and comprises one or more loudspeakers LS1,LS2,LS3.

In one embodiment, the local network is wireless, and the receiving 380 and replaying 390 of an output audio signal 251, . . . , 254 assigned to the room is done by a plurality of sound reproducing devices LS1-LS3,U21-U42 that are in the respective room. At least two of the sound reproducing devices are mobile devices U21-U42 that each do the replaying 390 via headphones or earphones. In this embodiment, the method further comprises the steps of detecting 382 the room information RK1, . . . , RK4 or another, alternatively usable room information that is available in the same room, by each of the at least two mobile devices, and selecting 383 the output audio signal assigned to the respective room in each of the mobile devices. Based on the detected room information, the selecting may be done automatically. In one embodiment, only authenticated sound reproducing devices or mobile devices respectively may reproduce the output audio signal associated with the respective room, while playback is prevented for non-authenticated sound reproducing devices. A sound reproducing device or mobile device is authenticated if the output audio signal to be reproduced by it is associated with the room whose room information it has detected.

Figure 4:
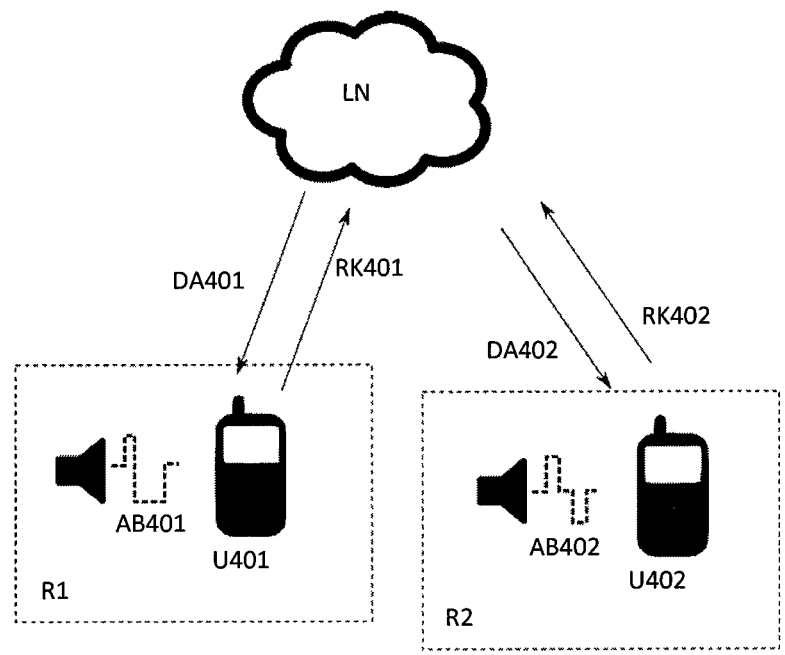
FIG. 4 a schematic representation of different rooms with different room information.

FIG. 4 shows a schematic representation of different rooms R1,R2 having different room information. The room information may be received via acoustic signals, which in this example are emitted by audio beacons AB401,AB402 such as ultrasonic beacons. The acoustic signals coming from the audio beacons AB401,AB402 each contain the room information. The mobile devices U401,U402 in the respective room transmit the received room information RK401,RK402 over the network LN to the server, which in response sends them the digital audio stream DA401,DA402 that is associated with their respective room.

Figure 5:
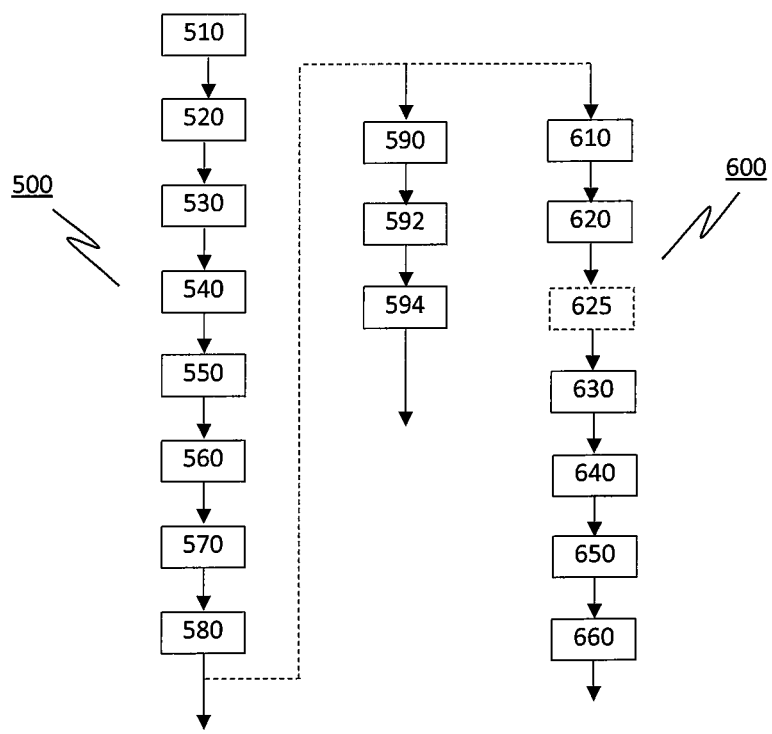
FIG. 5 a flow-chart of a method for receiving audio data streams with mobile devices.

FIG. 5 shows a flow-chart of a method for receiving audio data streams with mobile devices, according to one embodiment of the invention. The mobile devices are one example of the sound reproducing devices mentioned above. In the method 500 for receiving audio data streams with mobile devices U21-U42,U401,U402 in rooms R1,R2,R3,R4 in which sound is emitted via loudspeakers, each mobile device receives an audio data stream associated with the respective room. In the first step 510, each mobile device U21-U42,U401,U402 connects over a local network LN to a server AS that controls the sound emitted via loudspeakers in the rooms R1, . . . , R4. Herein, different sound is emitted in different rooms. In each mobile device, room information RK1, . . . , RK4 is detected automatically 520. It indicates, from the plurality of rooms, the room in which the respective mobile device is located. It is acoustically emitted in this room. The respective room information is transmitted 530 over the local network LN from each mobile device to the server AS. In the server, each room information is associated 540 with an output audio stream that corresponds to the sound emitted via loudspeaker in the room in which the mobile device U21, . . . , U402 has detected the room information. Herein, the server AS selects among a plurality of output audio data streams for the different rooms. Then, an output audio data stream AS401,AS402 is assigned 550 to each of the mobile devices in the server, wherein the assignment is done in accordance with at least the room information received by the respective mobile device. In the server, at least two different output audio data streams 251, . . . , 254 are assigned to at least two mobile devices that are located in different rooms R1, . . . , R4. The respectively assigned output audio data stream is transmitted 560 over the wireless local network LN to each of the mobile devices, where it is then received 570 and replayed 580.

For the acoustic emission of room information, the use of ultrasound is particularly advantageous, in particular a frequency range of 18-20 kHz, as described already above in connection with the wireless microphone. However, the emission of room information, or the detection 520 of room information in the mobile devices respectively, may in other embodiments alternatively be done optically or by electromagnetic near field (NFC). For emitting the room information, a pseudo-random CDMA code, like e.g. a Gold code, may be used to modulate a carrier signal. CDMA (Code Division Multiple Access) codes enable simultaneous transmission of different data streams in a common frequency range. In addition to a unique assignment, these codes offer the possibility of robust detection even with low signal-to-noise ratio (SNR) and the possibility of separating room information signals that spatially and temporally overlap, which is advantageous e.g. if a plurality of beacons are in the same room.

In one embodiment, the respective output audio data stream is transmitted to each mobile device via a unidirectional connection each. This may be e.g. a unicast (1:1) or multicast (1:N) downlink connection.

In one embodiment also shown in FIG. 5, the method optionally comprises the further steps of transmitting 590 over a further local network LN2 into at least one of the plurality of rooms the output audio data stream that is associated with the respective room, receiving 592 the transmitted output audio data stream 251, . . . , 254 in the room, and replaying 594 the received output audio data stream via at least one loudspeaker. Herein, the output audio data streams may be transmitted over the local network LN as well as over the further local network LN2, which may be e.g. a DANTE network. Together with the output audio data stream, also further visual data associated with the output audio data stream may be transmitted to the mobile device, which stores them and/or presents them on a display, e.g. presentation documents.

In one embodiment also shown in FIG. 5, a user may receive and replay not only the output audio data stream of the room the user is in, but also one or more output audio data streams associated with other rooms and distributed over the same local network LN or the same server AS respectively. For this purpose, the method comprises the further steps of displaying 610, on a display of the mobile device, another output audio data stream AD401,AD402 not associated with the room information, and receiving 620 a user input by which the user selects the other output audio data stream. The mobile device reports 630 the selected output audio data stream back to the server AS, which then transmits 640 the selected output audio data stream over the wireless local network LN to the respective mobile device. The mobile device receives 650 the transmitted output audio data stream and reproduces it 660. In a variant, the room information RK1,RK2, RK3 must be re-detected again 625 after displaying 610 the other output audio data stream or after receiving 620 the user input respectively, and the re-detected room information is comprised in the feedback 630 to the server AS that indicates the selected output audio data stream. These steps may also form a separate method 600 for switching to a different output audio data stream.

Generally, the local network LN is not limited to audio data and may also be used for general data transmission.

In one embodiment, the invention relates to a data storage medium having stored thereon program code adapted for configuring a mobile device to execute those steps of the method 500,600 that are to be executed by the mobile device.

In one embodiment, the invention relates to a data storage medium having stored thereon program code adapted for configuring a server as described above, so that it compiles the at least two output audio signals from the input audio signals. In another embodiment, the invention relates to a data storage medium having stored thereon program code adapted for configuring a mobile device to detect room information in its environment, authenticate itself over a local network to a server by using the room information and then be able to replay an output audio signal received from the server over the local network.

The invention is advantageously usable with audio reproduction systems for sound acquisition and sound output, in particular for providing, or receiving respectively, different output audio signals in a plurality of rooms.

The various embodiments mentioned above may be combined with each other, even if such combination is not expressly mentioned.

The invention claimed is:

1. A method for receiving audio data streams with mobile devices in a plurality of rooms in which sound is emitted via loudspeakers, wherein each mobile device receives an audio data stream assigned to the respective room, the method comprising:

connecting each mobile device over a wireless local network to a server that controls the sound that is emitted in the plurality of rooms via the loudspeakers, wherein different sound is emitted in different rooms;

in each mobile device, automatically detecting room information, wherein the room information indicates the room among the plurality of rooms in which the mobile device is located, and wherein the room information is acoustically emitted in a frequency range above 18 kHz in the respective room;

transmitting the respective room information over the wireless local network from each mobile device to the server;

in the server, associating each room information with an output audio data stream that corresponds to sound emitted in the room in which the respective mobile device has detected the room information, wherein the server selects among a plurality of output audio data streams from different rooms;

in the server, assigning an output audio data stream to each of the mobile devices, wherein the assigning is done in accordance with at least the room information received by the respective mobile device, wherein in the server at least two different output audio data streams are assigned to at least two mobile devices that are located in different rooms;

transmitting the respectively associated output audio data stream over the wireless local network to each mobile device; and in the mobile device, receiving and reproducing the respective output audio data stream.

2. The method according to claim 1, wherein the room information is controlled by the server and is detected in the respective room only.

3. The method according to claim 1, wherein the wireless local network is not limited to audio data and is configured to be used for general data transmission.

4. The method according to claim 1, wherein the room information is in the frequency range 18-20 kHz and is emitted by the loudspeaker.

5. The method according to claim 1, wherein the room information is encoded by a CDMA code.

6. The method according to claim 1, wherein the respective output audio data stream is transmitted to each mobile device via a unidirectional connection.

7. The method according to claim 6, wherein the unidirectional connection is a multicast connection.

8. The method according to claim 6, wherein the unidirectional connection is a unicast connection.

9. The method according to claim 1, further comprising:
transmitting, over a further local network, into at least one of the plurality of rooms the output audio data stream associated with the respective room;

receiving the transmitted output audio data stream in the room; and replaying the received output audio data stream via at least one loudspeaker.

10. The method according to claim 9, wherein the output audio data streams are transmitted to at least one of the plurality of rooms over both the wireless local network and the further local network, and wherein the further local network is a DANTE network.

11. The method according to claim 1, wherein visual data associated with the output audio data stream are transmitted to the mobile device, together with the output audio data stream, wherein the visual data are stored and/or presented on a display of the mobile device.

12. The method according to claim 1, further comprising:
in a mobile device, displaying another output audio data stream not associated with the room information, and receiving a user input selecting the other output audio data stream;

reporting the selected other output audio data stream to the server;

transmitting the selected other output audio data stream over the wireless local network to the respective mobile device; and receiving and reproducing at the mobile device the transmitted other output audio data stream.

13. The method according to claim 12, further comprising:
re-detecting the room information after the displaying the other output audio data stream, wherein the re-detected room information is contained in the reporting of the selected output audio data stream to the server.

14. A non-transitory storage medium having stored thereon program code adapted for configuring a mobile device to execute the method according to claim 1.

15. A mobile device with a non-transitory storage medium according to claim 14 and at least one processor that is configurable by the program code stored on the non-transitory storage medium.

* * * * *

UNITED STATES PATENT AND TRADEMARK OFFICE
CERTIFICATE OF CORRECTION

PATENT NO. : 11,019,428 B2
APPLICATION NO. : 16/679428
DATED : May 25, 2021
INVENTOR(S) : Steffen Matthias et al.

Page 1 of 1

It is certified that error appears in the above-identified patent and that said Letters Patent is hereby corrected as shown below:

On the Title Page

(72) Inventors: delete "SenthilKumar Vellaichamy" and insert -- Senthil Kumar Vellaichamy --

Signed and Sealed this
Eleventh Day of October, 2022

Katherine Kelly Vidal
*Director of the United States Patent and Trademark Office*